United States Patent [19]

DeWachter et al.

[11] Patent Number: 5,076,115
[45] Date of Patent: Dec. 31, 1991

[54] CORROSION RESISTANT GEAR BOX

[75] Inventors: Gary DeWachter; John K. Newton, both of Greenville, S.C.

[73] Assignee: Reliance Electric Industrial Company, Greenville, S.C.

[21] Appl. No.: 511,465

[22] Filed: Apr. 20, 1990

[51] Int. Cl.⁵ .................... F16H 57/00; B32B 27/00
[52] U.S. Cl. .................. 74/606 R; 74/89.17; 74/DIG. 10; 428/422; 29/527.2
[58] Field of Search .......... 74/606 R, DIG. 10, 89.17; 428/422; 29/527.2

[56] References Cited

U.S. PATENT DOCUMENTS

| | | | |
|---|---|---|---|
| 3,076,668 | 2/1963 | Famely | 74/DIG. 10 |
| 3,389,749 | 6/1968 | Towns et al. | 428/422 |
| 3,931,748 | 1/1976 | Tertinek et al. | 74/606 R |
| 4,277,200 | 7/1981 | Speakman | 428/422 |
| 4,374,874 | 2/1983 | Blitstein et al. | 428/422 |
| 4,584,893 | 4/1986 | Harding et al. | 74/89.17 |
| 4,623,087 | 11/1986 | Conolly | 29/527.2 |
| 4,645,440 | 2/1987 | Murata et al. | 428/422 |

Primary Examiner—Leslie A. Braun
Assistant Examiner—Winnie Yip
Attorney, Agent, or Firm—Dority & Manning

[57] ABSTRACT

A gear box or the like adapted for prolonged effective use in a harsh and/or corrosive environment such as found in the chemical industry and are in which salt water is prevalent. Components of the gear box are provided with protective polymer coatings which are low friction and impervious to attack from the environment and materials used therein. Exterior surfaces of the housing are coated with a polymer that also withstands impact from foreign objects as exemplified by polyamides, epoxies and fluorocarbons with nylon being preferred. Other components such as the input shaft, bushings and the like are preferably coated with one or more layers of fluorocarbon polymers, with layers in contact with the component including a thermosettable binder component such as a phenolic. Certain coating thicknesses are most preferred.

10 Claims, 2 Drawing Sheets

CORROSION RESISTANT GEAR BOX

BACKGROUND OF THE INVENTION

This invention relates to gear boxes and, particularly, to gear box structures which are coated with corrosion resistant material for permitting use of the gear box within a corrosive environment, particularly a salt water environment.

Conventional gear boxes are generally devised as a heavy duty tool, particularly constructed to withstand long-time usage under extreme power requirements and under adverse conditions. However, it has been found that the life span for a gear box in a salt water or other harsh environment is reduced considerably from many years to only a few weeks before corrosion deteriorates the gear box beyond further useful service. The materials utilized in conventional gear boxes are generally cast iron and/or steel and, in special applications, stainless steel in order to ensure long life usage. Since cast iron and steel offer little or no protection, eventually stainless was introduced to obviate this problem. However, even stainless steel is not able to survive a salt water environment, and at best, may only prolong the life of the gear box very slightly.

Therefore, it is a principal object of the present invention to enhance the life span of gear boxes under adverse corrosive environments such as those involving salt water, fertilizers, concrete, sewage disposal, and chemical processes.

Another object of the present invention is to improve the art of gear boxes by permitting the use of standard materials susceptible to corrosion in the construction of the same and yet extend the life span for these devices.

These and other objects of the present invention are achieved by the present invention which is directed to a gear box or the like which has a corrosion resistant material coating thereon, preferably a fluorocarbon polymer which is impervious to oxidation, chemical attack and the like. In a most preferred arrangement, two different coatings of fluorocarbon polymers may be applied in particular thickness ranges. The coating thicknesses are devised in accordance with acceptable tolerances associated with each of the details of the gear box assembly in order to avoid any binding in the movement of the parts and the prevention of inadvertent wear of the material from the parts while also affording the desired protection in harsh environments.

In a most preferred embodiment, the outer housing of the gear box or the like is coated with a polymeric material which not only will resist corrosion and chemical attack, but which also has adequate resilience and/or toughness to withstand blows from hammers, wrenches and other foreign objects and which will not chip off the structure. Polyamides such as nylon are most preferred for coating of the outer housing though epoxies and fluorocarbons may also be applied thereto. Other elements which are normally received within the exterior housing and/or otherwise located where damage from foreign objects is not likely are preferably covered with fluorocarbon coatings. Practically speaking, the polytetrafluoroethylenes are most often employed and, when in direct contact with the metal, include a thermoset binder component such as a phenolic for proper adherence to the prepared metal surface. Further, a top coating of polytetrafluoroethylene polymer composition may then be applied atop the base coating for crosslinking therewith.

These and other objects of the present invention will become apparent when reading the following specification taken in conjunction with the accompanying wherein.

DESCRIPTION OF THE PREFERRED EMBODIMENT

Figure 1:
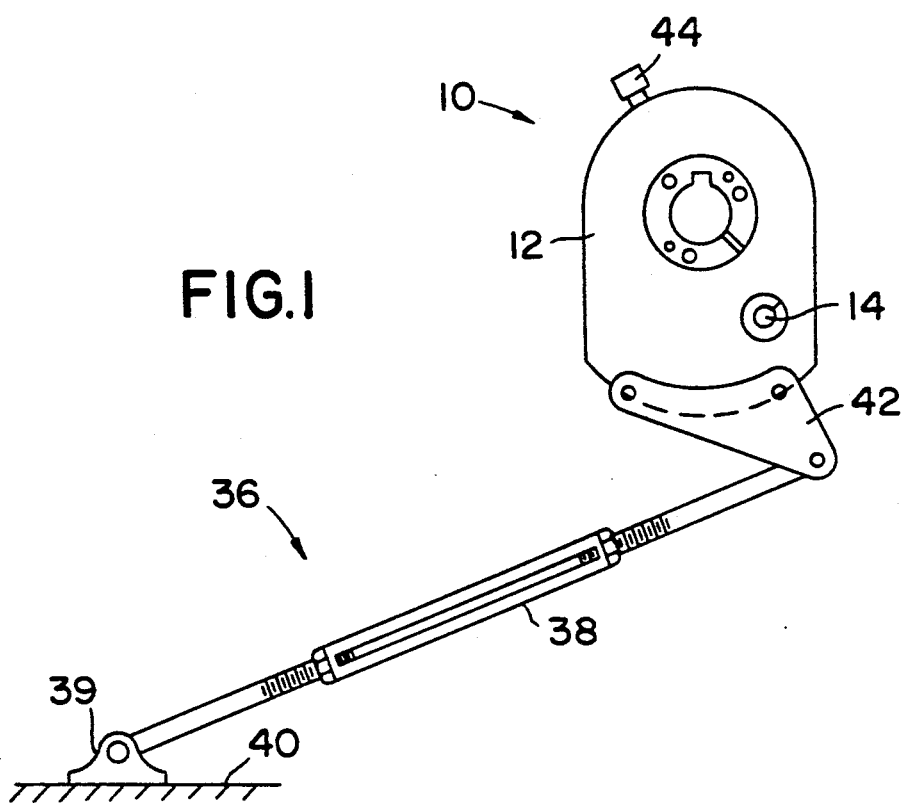
FIG. 1 is an elevational view of a speed reduction device showing the device combined with a torque arm assembly.
Figure 2:
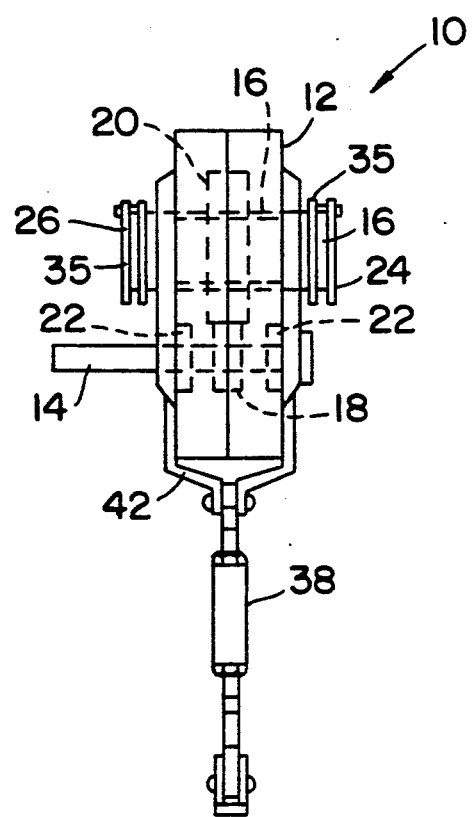
FIG. 2 is a side view of the device illustrated in FIG. 1.

As shown in FIGS. 1 and 2, a typical gear reduction device, for example, a reducer, is indicated generally by the reference numeral 10 as including a housing 12, an input shaft 14 and an output hub 16.

The input shaft 14 is formed with a pinion 18 integral therewith within the housing 12 and being in operative engagement with a output gear 20 enmeshed therewith. Suitable sealing devices 22, such as double-lipped rings, or the like, surround the shaft 14 within the housing 12 for sealing against the influx of outside material into the housing.

Figure 3:
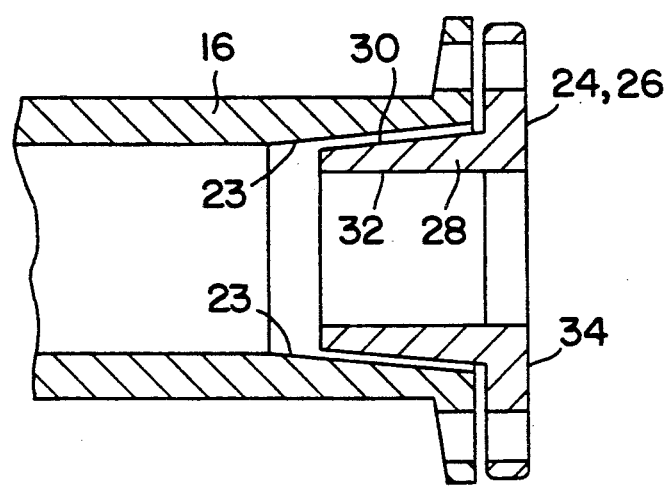
FIG. 3 is a cross-sectional view of a bushing element used in the reduction device of FIG. 1.
Figure 4:
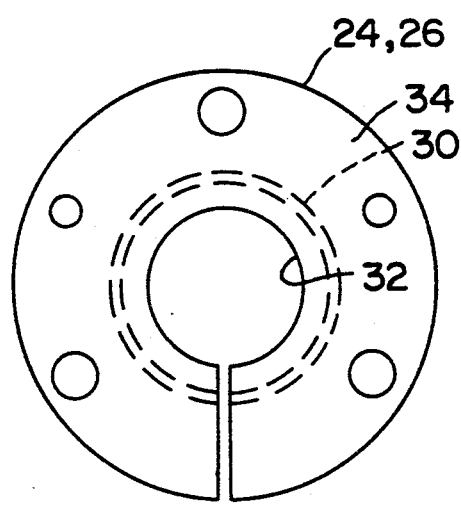
FIG. 4 is an end view of the bushing applied to the output hub for the device.

The output hub 16 is formed with a tapered inner surface 23 at each end and having fitted thereto tapered bushing 24, 26 positioned on both sides of the housing 12, the details of each bushing being illustrated in FIGS. 3 and 4. Each of the bushings includes a cylindrical element or barrel 28 having its outer circumferential surface 30 tapered for engagement with the corresponding tapered surface 23. Interior circumferential surface 32 formed on the element 28 is arranged to receive an output shaft (not shown) useful with the reduction box 10. The bushings 24, 26 are the subject matter of a companion application filed concurrently herewith to the same inventors which is incorporated herein by reference.

Each of the bushings 24, 26 is formed with a flange 34 to which a hub back-up plate 35 may be attached as well as coupling devices (not shown) for connecting the hub 16 to a driven mechanism. While the hub 16 and the bushings 24, 26 are described and illustrated as having cooperating tapered surfaces, which is the preferred structural arrangement for effecting a driving connection to a driven mechanism, it will be understood that other forms of surfaces may be utilized, such as a key and groove or splines, as well as straight walled bushings.

The gear reduction box 10 also includes a torque arm assembly generally indicated by the reference numeral 36 having a turnbuckle 38 secured at one end by a fulcrum device 39 to a suitable rigid structure 40 and at its other end to an adapter plate 42 secured to the lower section of the reduction box 12. The assembly 36 maintains the box 10 against rotation during operation, and the turnbuckle provides adjustability as to positioning of the fulcrum 39, and to permit tightening of belts, etc.

The gear box 10 also includes a sealed expansion chamber 44 for permitting the introduction of a lubricant into the box and provide a relief spacer for expansion of lubricants and/or air during the normal operation of the box. The chamber 44 replaces the conventional standard vented breather normally associated with gear boxes.

As stated in the foregoing, the gear box 10 is arranged to be corrosion resistant and impervious to most environments, in particular, with respect to extremely corrosive environments, such as salt water, fertilizers, concrete, sewage disposal and chemical processes, for preventing premature rusting and deterioration of the internal parts as well as the external parts of the box. In accomplishing this goal, the gear box housing 12 is coated with a protective coating such as epoxy coatings, or polyamides exemplified by nylon, the latter being preferred due to its unique characteristic of being most durable of the known materials for this purpose. The coating of the nylon has a thickness approximately 0.008" to 0.020". The input shaft 14 is coated with a base coat of a polytetrafluoroethylene polymer having a thermoset binding material, such as a phenolic binder included therein for adherence to these parts, the coating having a thickness of 0.0004" to 0.0006" and being applied from the end of the shaft and extending into the housing 12 under the adjacent input seals 22. Such coating thus effectively covers all exposed portions of the input shaft. The hub 16 is preferably made from stainless steel but may also be made of steel coated with a base coating of a polytetrafluoroethylene with a binding material.

The bushings, 24, 26, including the tapered surface 30, the interior surface or bore 32, and the flange 34 are also base coated with a base coating of a fluorocarbon polymer such as a polytetrafluoroethylene polymer having a thermoset binding material included therein. Similarly, the torque arm assembly and the fulcrum 39 has applied thereto a base coating of the polymer with binding material. A coating of a nylon is applied to the adapter plates 42 to a thickness of 0.008" to 0.020". In addition to the base polymer composition, further a top coating may be applied to the bushings 24, 26, the torque arm assembly 36, the fulcrum 39, and other like coated parts of another or same fluorocarbon, though without a thermoset binder, and thus is thermoplastic in character. The fluorocarbon polymer of the top coat is thus in a more pure form to greatly enhance the protective nature of these materials against corrosive environments. The top fluorocarbon polymer binds with the base coat under proper temperature-time conditions. The combined coatings applied to the bushings 24, 26, including the flange 34, the surface 30 and bore surface 28, have a thickness of 0.0015" to 0.002" and the combined coatings on the torque arm assembly 36 and fulcrum 39 is 0.0015" to 0.002".

From the foregoing, it will be appreciated that the present invention provides the use of a gear box for use in extreme environments without causing rusting or deterioration of the internal and exterior parts of the box. In accomplishing this goal, various coatings have been applied to critical elements of structure and to thicknesses which will prevent or minimize wear of the applied coating during operation of the gear box as well as protect the elements from the harsh environment. With the specified coating being applied to the outer surfaces of the barrel of the bushing, considerably less friction is present between the surfaces and the hub 16, thereby enabling easy removal of the bushing. In actual operation, the bushings pop out even against the stainless steel of the hub, or against the base coating of the polymer applied to steel if such coating is utilized. In effect, then, the coatings on the tapered surfaces also provide a substantial mechanical advantage as well as to minimize deterioration. In the event that other than tapered surfaces are utilized between the bushings and the hub, the coatings of polytetrafluoroethylene polymer with and without binder enables ease of assembly and disassembly of these parts, even in corrosive environments. The thicknesses of the specified coatings for the different structural elements provide optimum operating conditions which will not only protect the gear box and its structural elements from undue rusting and deterioration, but also to prevent the stripping or wearing of the material comprising the coatings during operation.

While other fluorocarbon polymers may be employed in accordance with the present invention, a preferred base polymer is a polytetrafluoroethylene with a phenolic binder, such as Teflon S, a fluorocarbon coating material produced by E. I. duPont, Wilmington, Del., which is quite suitable and may be applied to the prepared metal surface by spraying or the like. Preparation of the metal part includes cleaning of the part to remove oils, greases, and the like, roughening of the part by grit blasting or the like and preheating of the part to a suitable metal temperature, e.g., about 400° F. to about 425° F. Top coatings may thereafter be suitably applied as by electrostatic spray techniques followed by heating at temperatures of about 725° F. for about 20 minutes, or the like.

Products coated according to the present invention thus not only resist corrosion and other deterioration in harsh environs, but also have been found to facilitate cleaning such as by high pressure washes and facilitate better seating of the inter-related elements, while at the same time facilitating ease of removal for repair, replacement and the like. It has, in fact, been unexpectedly found that bushings coated according to the present invention transmitted adequate torque without keys or splines. While it was anticipated that a significant drop in torque would be experienced, such was not the case. In fact, only very slightly less torque is realized.

While preferred embodiments of the various aspects of the invention have been described using specific terms and arrangements, such descriptions are for illustrative purposes only, and it is to be understood that changes and variations may be made without departing from the scope of the following claims.

What is claimed is:

1. A gear box suitable for use in a harsh environment in which corrosive materials or the like may be present comprising:

a housing having external exposed surfaces, said housing having a protective polymeric coating covering said exposed surfaces substantially entirely;

an input shaft extending into said housing through an opening defined in said housing and extending outwardly from said housing, said input shaft outwardly extending portion having at least one fluorocarbon polymer coating thereon;

sealing means associated with said input shaft in cooperation with said housing for providing sealing arrangement therealong adjacent said opening in said housing;

a rotatable output hub received in said housing through an opening defined therein on a side of said housing different from said input shaft and said hub being in a geared relationship with said input shaft;

at least one bushing operatively associated with said hub, said bushing having a barrel with a flange provided at an end of same and said bushing defining an inner bore therethrough, and surfaces of said flange and said barrel having a fluorocarbon polymer coating thereover, whereby said coating provides the bushing with a better seal within said hub and provides protection from said corrosive materials.

2. A gear box as defined in claim 1 wherein said coating of protective material on exterior surfaces of said housing is nylon.

3. A gear box as defined in claim 1 wherein said fluorocarbon polymeric coatings are a polytetrafluoroethylene polymer with polymers applied directly to said input shaft and said output hub including a thermoset binder.

4. A gear box as defined in claim 3 wherein said fluorocarbon coatings of polytetrafluoroethylene polymers also include plural coating layers.

5. A gear box as defined in claim 1 wherein said bushing barrel has a tapered outer surface for mating contact with an oppositely tapered inner surface of said hub.

6. A gear box as defined in claim 1 wherein said coating of protective material on exterior surfaces of said housing is nylon having a thickness in the range of 0.008 inch to 0.020 inch.

7. A gear box as defined in claim 1 wherein said coating of fluorocarbon polymer on said input shaft has a thickness in the range of 0.0004 inch to 0.0006 inch.

8. A gear box as defined in claim 4 wherein combined coatings of fluorocarbon polymers have a thickness in the range of 0.0015 inch to 0.002 inch.

9. A gear box for use in a harsh or corrosive environment comprising:

a housing having a coating of nylon applied to all exterior surfaces of same; said housing defining input shaft and hub receiving openings therein;

an input shaft extending into said housing through said opening therefor and extending outwardly from said housing and sealing means located about said input shaft at said housing opening therefor for sealing said housing as to said harsh or corrosive environment, said input shaft having a coating of polytetrafluoroethylene polymer with a thermoset binder at least along surfaces of same outside said housing; and a rotatable output hub received in said opening in said housing therefor, said output hub being in a geared relationship with said input shaft, said hub defining an opening therein and having a tapered surface along at least a portion of the length of same; and a bushing having a barrel with a flange secured at an end of same, said bushing defining a shaft receiving opening therethrough, an outer surface of said barrel being tapered for operative engagement with said tapered surface of said hub opening, said flange, tapered outer surface and said inner opening of said bushing having a coating of a polytetrafluoroethylene polymer with a thermoset binder material thereon whereby the coating provides the bushing with a better seat within said hub and provides protection from said harsh or corrosive environment;

10. An improved speed control device for use in a wet harsh or corrosive environment comprising:

a housing, said housing having an external exposed surface, said housing further defining openings therein for receipt of input and output elements, substantially the same external exposed surface of said housing having a polymer coating thereover, said polymer being a tough, resilient polymer impervious to the harmful or corrosive effects of said environment;

an input shaft received in one of said housing openings and extending outwardly therefrom, sealing means received thereabout to seal said opening through which said shaft extends and protect the inside of said housing from said environment, said input shaft having a flurocarbon polymer coating over at least portions of said shaft which will be exposed to the harsh environment during use, said polymer coating being resistant to attack by said environment;

a hub received through another of said openings in said housing and being in a geared relationship with said input shaft, said hub defining an opening therein; and at least one bushing, said bushing having a barrel with a flange secured to an end of same, said bushing defining a shaft receiving bore extending axially through said barrel, outer surfaces of said barrel mating with surfaces of said opening in said hub, all exterior surfaces of said bushing having a fluorocarbon coating thereover which provides an improved seat with said hub and provides protection from said wet harsh or corrosive environment.

* * * * *